(12) United States Patent
Kotzin

(10) Patent No.: US 8,788,940 B2
(45) Date of Patent: Jul. 22, 2014

(54) SYSTEM FOR GENERATING AND DISTRIBUTING CONTENT EDITING INFORMATION

(75) Inventor: Michael D. Kotzin, Buffalo Grove, IL (US)

(73) Assignee: Motorola Mobility LLC, Libertyville, IL (US)

(*) Notice: Subject to any disclaimer, the term of this patent is extended or adjusted under 35 U.S.C. 154(b) by 2909 days.

(21) Appl. No.: 11/236,166

(22) Filed: Sep. 27, 2005

(65) Prior Publication Data

US 2007/0074104 A1    Mar. 29, 2007

(51) Int. Cl.
*G06F 17/00* (2006.01)

(52) U.S. Cl.
USPC ........... 715/723; 715/209; 715/810; 715/205; 715/234; 715/250; 715/243; 715/239; 715/751; 703/2

(58) Field of Classification Search
USPC ........ 715/255, 242, 708, 209, 810, 205, 234, 715/250, 723, 243, 239, 751; 703/22
See application file for complete search history.

(56) References Cited

U.S. PATENT DOCUMENTS

| | | | |
|---|---|---|---|
| 2001/0023436 A1* | 9/2001 | Srinivasan et al. | 709/219 |
| 2002/0092019 A1* | 7/2002 | Marcus | 725/37 |
| 2003/0122966 A1* | 7/2003 | Markman et al. | 348/563 |
| 2004/0150663 A1* | 8/2004 | Kim | 345/723 |
| 2004/0190853 A1 | 9/2004 | Dow et al. | |
| 2004/0210945 A1* | 10/2004 | Snyder et al. | 725/135 |
| 2005/0188403 A1* | 8/2005 | Kotzin | 725/47 |

* cited by examiner

*Primary Examiner* — Quoc A Tran
(74) *Attorney, Agent, or Firm* — Fenwick & West LLP

(57) ABSTRACT

A method includes generating a content editing command file devoid of content by editing content. The content editing command file may be used to edit other copies of the same content that was edited to generate the content editing command file. Multiple content editing command files having some variability may be combined to form an aggregated content editing command file.

16 Claims, 4 Drawing Sheets

SYSTEM FOR GENERATING AND DISTRIBUTING CONTENT EDITING INFORMATION

FIELD OF THE DISCLOSURE

The present disclosure relates generally to content editing and more particularly to methods and systems for creating and distributing editing files for editing digital content wherein the editing files are devoid of the content that they are intended to edit.

BACKGROUND

Recording or downloading of video content is common. Content received via radio, television or an Internet broadcaster can be recorded on a recorder, for example, a digital video recorder (DVR). Oftentimes the recorded programming includes content that viewers may wish not to view. For example, viewers may wish to view recorded programming where certain content, like commercials or expletives, have been deleted. Viewers may also wish to view sports events where delay between plays has been edited. Other examples of content editing include content compression, for example, where viewers attempt to rapidly scan from play to play in sports and other types of programming. It is also known to remove content based on detectable changes, for example, changes in luminosity and/or volume, which may be indicative of content that should be edited.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
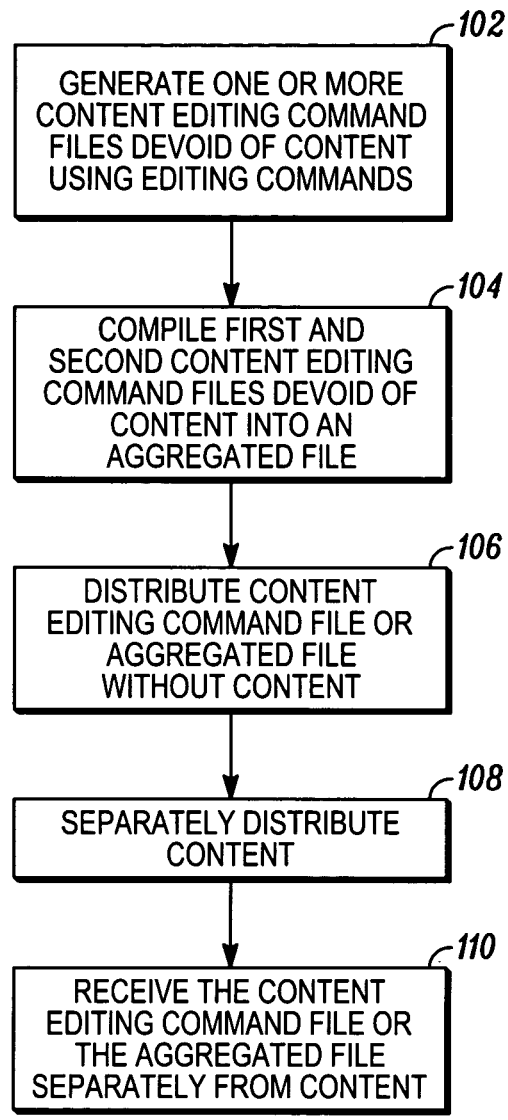
FIG. 1 is a process flow chart.

In one embodiment, the content editing commands of the content editing information file are produced by editing a copy of the content that the file was created to edit. For example, a user may edit content, like an audio or video clip, and save the editing commands used to edit the content for use in creating an editing information file that can be used to edit unedited copies of the same content. In other embodiments, the content editing commands are produced without actually editing any content. For example, the editing commands may be produced by virtually editing the content. The editing commands may also be produced or generated automatically. Whether the content is edited manually or automatically is immaterial. A non-exhaustive list of editing examples, include content deletion, content compression, content insertion among other forms of editing. The particular form of editing is immaterial. The source or form of content editing commands is immaterial. The editing commands are incorporated into an editing file, which may then be used to edit unedited copies of the content that was edited to create the commands in the file. The content edited may be analog or digital and may be in the form of a file, for example, an audio or video file, or a streaming source.

Generally the content editing information file includes a reference mechanism to control the editing process so that the file may be used to edit un-edited copies of the content that was edited to create the edit commands in the file. The reference mechanism ensures that the edits are applied to appropriate portions of the content. Generally, the editing file reference may be referenced relative to the start or beginning of the content to be edited. For some content, a counter may be used as a reference to ensure that the intended portions of the content are edited. In other applications, a timing reference is used to ensure that the intended portions of the content are edited. References are known generally and are used in connection with different types of content, for example, in DVDs, television signals, video tape, etc. It is not necessary however that the content to be edited include a reference with which the reference in the editing command file is synchronized. For example, the start-time of the content may be used as a reference from which subsequent edits are applied.

Generally, the content editing information file includes a reference mechanism to control the editing process so that the file may be used to edit unedited copies of the content that was edited to create the edit commands in the file. The reference ensures that the edits are applied to appropriate portions of the content. Generally, the editing file reference may be referenced relative to the start or beginning of the content to be edited. For some content, a counter may be used as a reference to ensure that the intended portions of the content are edited. In other applications, a timing reference is used to ensure that the intended portions of the content are edited. References are known generally and are used in connection with different types of content, for example, in DVDs, television signals, video tape, etc. It is not necessary however that the content to be edited include a reference with which the reference in the editing command file is synchronized. For example, the start time of the content may be used as a reference from which subsequent edits are applied.

In one embodiment, the server or other entity receives or generates a plurality of content editing command files for editing the same content, wherein at least some of the content editing files are different. The content editing files contain different editing commands for editing different parts of the content. One file may delete commercial sponsor portions of the content, and another file may compress commercial sponsor content, etc. Alternatively, the content editing files may contain edit commands for editing the same content, but with some variability in the edit commands, for example, variability with regard to where the content deletions start and stop. In some instances, this variability results from variability in the source of the content editing file, e.g., editors that provide the content editing commands or files. The content editing command files are generally devoid of the content edited.

In one embodiment, the server or other entity receives or generates a plurality of content editing command files for editing the same content, wherein at least some of the content editing files are different. The content editing files contain different editing commands for editing different parts of the content. One file may delete commercial sponsor portions of the content, and another file may compress commercial sponsor content, etc. Alternatively, the content editing files may contain edit commands for editing the same content, but with some variability in the edit commands, for example, variability with regard to where the content deletions start and stop. In some instances, this variability results from variability in the files' sources, e.g., editors providing the content editing commands or files. The content editing command files are generally devoid of the content edited.

According to one aspect of the disclosure, the server receives different content editing command files and compiles some or all of them into an aggregated content editing command file. For example, the aggregated content editing command file may be an editing script providing information indicating what content portions are to be deleted. The aggregation may be based on an averaging of variations in the editing commands of two or more content editing files having commands to edit the same content portions. Alternatively, the aggregation may be based on the type of editing commands in the files. For example, aggregation may be based on combining only delete commands or based on combining delete and compress commands. The content editing command files and the aggregated content editing command file preferably do not contain any of the content intended to be edited. The individual editing command files or the aggregated content editing command file may be used by others to edit the same content. In this manner, the editing commands may be distributed without inclusion of the content that the editing commands edit.

Figure 2:
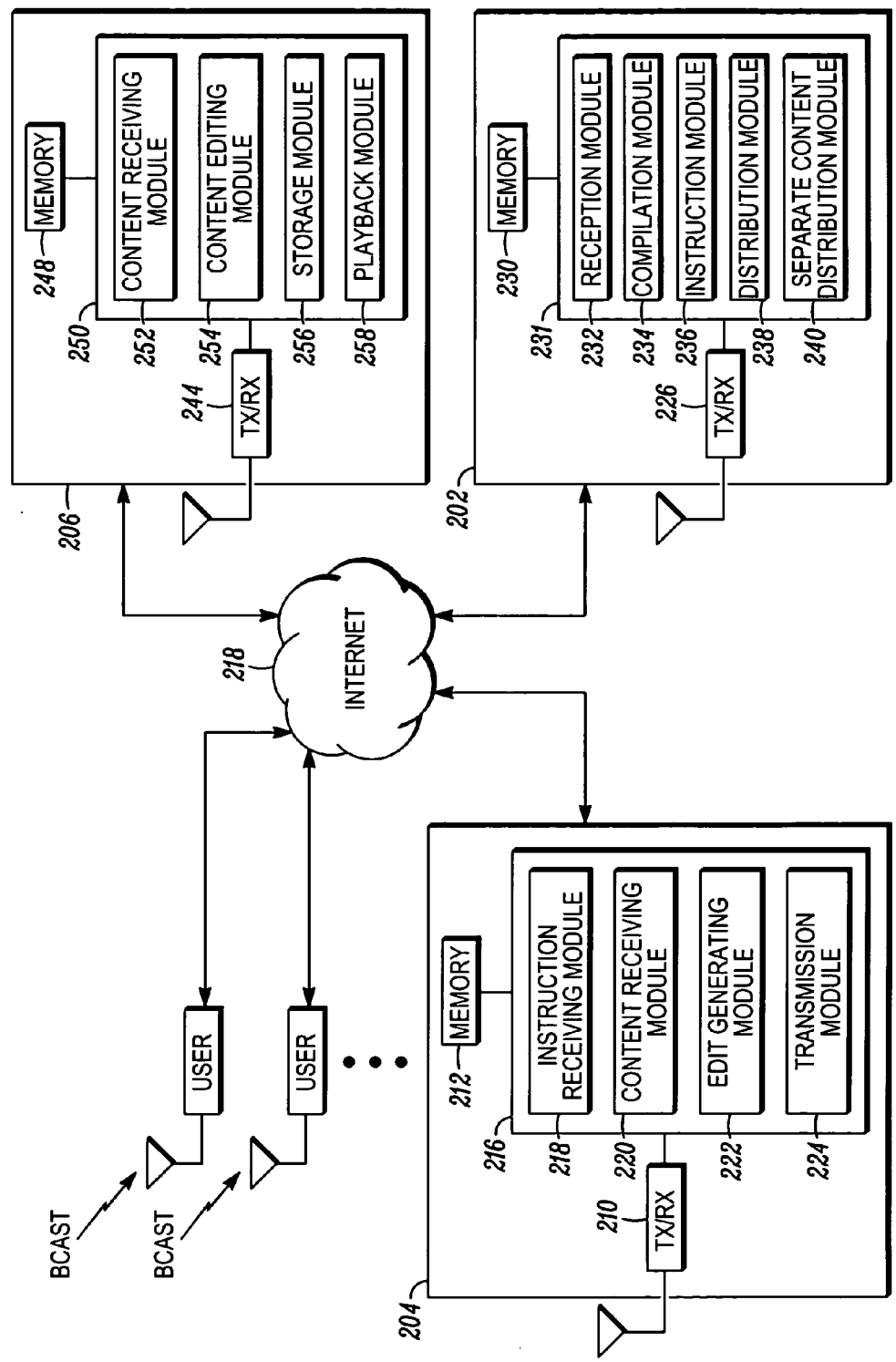
FIG. 2 is a system for receiving, processing and distributing content editing information.

FIG. 1 is a process flow chart illustrating steps described further below. The steps can be carried out by a system as illustrated in FIG. 2 or alternatively in a single entity. A user or entity, either of which may or may not be a subscriber, can view content and edit the content while viewing. For audio editing applications, the user can edit content while listening to it. Alternatively, the user may automate the content editing process.

In FIG. 1, at 104, in embodiments where more than one content editing command file is generated, multiple content editing command files, or portions thereof, may be combined or aggregated to produce an aggregated content editing command file, which is also devoid of content. In one embodiment, the aggregation is performed by a server or some other entity that receives multiple content editing command files, for example, files originated from different sources or produced by a single source at different times, etc. Alternatively, the plurality of content editing command files may also originate from a single source.

In FIG. 1, at 104, in embodiments where more than one content editing command file is generated, multiple content editing command files, or portions thereof, may be combined or aggregated to produce an aggregated content editing command file, which is also devoid of content. In one embodiment, the aggregation is performed by a server or some other entity that receives multiple content editing command files, for example, files originated from different sources or produced by a single source at different times, etc. Alternatively, the plurality of content editing command files may also originate from a single source.

In FIG. 1, at 106, the server or other entity distributes to a subscriber, recipient or another entity a content editing command file and/or an aggregated content editing command file. A single content editing command file and/or an aggregated content editing command file may also be referred herein to as a "file", or an "editing file", or an "editing command file", or "editing information". The editing command file may include commands, details, and variations for editing content. For example, there may be more than one set of commands available providing different runtimes for the same content depending on the editor's choice.

Other details or variations may be also included in the content editing information. For example, the aggregated editing file may include a directory of the different kinds of edits that can be performed. The user then selects what he wants, e.g., a combination of removing commercials and eliminating dead-time between plays, from the menu. Thus in some embodiments, the content editing command file may include different editing options from which the user may select, for example, from a menu or other user interface produced by the editing command file. For example, one user may edit out certain commercials and all time-out periods, another user may choose to edit out certain other commercials and all instant replays, and another user may keep all commercials, but edit all discussion by sideline commentators, assuming that these options are available.

In FIG. 1, at 108, in a separate transaction from the distribution of an editing command file, the server or other entity distributes content to a subscriber or other entity. The content is typically delivered to or obtained by users in an unedited form. The content is in a file or other form that is separate from the editing command file, which edits the content. While the files are separate, they may be transmitted in a single, unified or contemporaneous data transmission. Alternatively, the content may be distributed in some other manner, for example, by broadcast. The content may also be obtained from a source other than the source from which the content editing file is obtained. More generally, the content to be edited may be obtained at any time, before or after the content editing command file is created or obtained. In one example, a subscriber might record broadcast content at the same time it is received by the entity that creates the editing commands. For another example, a user may obtain the content by renting or purchasing a DVD via a communication link, for example, network 218 in FIG. 2, or from other sources such as traditional broadcasting, file transfer, commercial purchase, etc. In FIG. 1, at 110, content may be edited, for example, by a subscriber or other entity, at 112 using the content editing command file.

FIG. 2 illustrates a system including devices such as server 202 for receiving, processing and distributing data, at least one user or subscriber device 204 for generating a content editing command file and another user or subscriber device 206 for receiving, separately, unedited content and an editing command file by which to edit the unedited content. The device 204 may also edit content using the content editing command file. Once processed, the edited content may be viewed in real time and/or saved for subsequent viewing.

In one embodiment, a set of command instructions for accomplishing the editing tasks and for generating the content editing information file is stored in memory on the device generating the content editing file. The set of command instructions for example may insert header information which calibrates the content. Other instructions for making deletions, compression, enhancements or other modifications can be included in the set of command instructions. The set of command instructions stored in memory may be downloaded via the receiver/transmitter from a server or obtained from some other source. Alternatively, the instructions may be stored on a portable information storage medium. The set of command instructions for making the edits also may be installed during manufacture of the hardware device or an instruction module of the server can download to a plurality of users the set of command instructions by which to generate an editing command file.

In one embodiment, a set of command instructions for accomplishing the editing tasks and for generating the content editing information file is stored in memory on the device generating the content editing file. The set of command instructions for example may insert header information which calibrates the content. Other instructions for making the deletions, compression, enhancements or other modifications can be included in the set of command instructions. The set of command instructions stored in memory may be downloaded via the receiver/transmitter from a server or obtained from some other source. Alternatively, the instructions may be stored on a portable information storage medium. The set of command instructions for making the edits also may be installed during manufacture of the hardware device or an instruction module of the server can download to a plurality of users the set of command instructions by which to generate an editing command file.

A subscriber device 206 can subsequently download or receive in any other manner one or more content editing command files from the server 202. The device 206 includes a transmitter/receiver 244, a controller 246 and a memory 248. As mentioned above, the content may be delivered to the subscriber separately from the content editing command file, for example, by traditional broadcasting or any other suitable manner. The controller includes instruction modules 250 for editing content using the content editing command file. Exemplary modules include a content receiving module 252, a content editing module 254, a storage module 256 and a playback module 258. More generally, the device 206 may also include modules for editing content and creating content editing command files discussed in connection with device 204.

A subscriber device 206 can subsequently download or receive in any other manner one or more content editing command files from the server 202. The device 206 includes a transmitter/receiver 244, a controller 246 and a memory 248. As mentioned above, the content may be delivered to the subscriber separately from the content editing command file, for example, by traditional broadcasting or any other suitable manner. The controller includes instruction modules 250 for editing content using the content editing command file. Exemplary modules include a content receiving module 252, a content editing module 254, a storage module 256 and a playback module 258. More generally, the device 206 may also include modules for editing content and creating content editing command files discussed in connection with device 204.

In FIG. 2, the subscriber 206 may receive from the server 202 an editing command file that can operate locally on content that the subscriber has captured. The same command file can also be sent to other recipients. Additionally, other technology such as push technology may provide delivery of an editing command file. The subscriber can obtain the content before or after receiving the content editing file. If the subscriber's device 206 has limited memory, the subscriber may wish to receive the editing command file first, and then perform the editing with the editing command file while receiving streaming content. In this way, the device's memory 248 stores and/or presents/displays/renders only an edited version of the content. Editing streaming content need not be limited however to cases where memory is limited.

Figure 3:
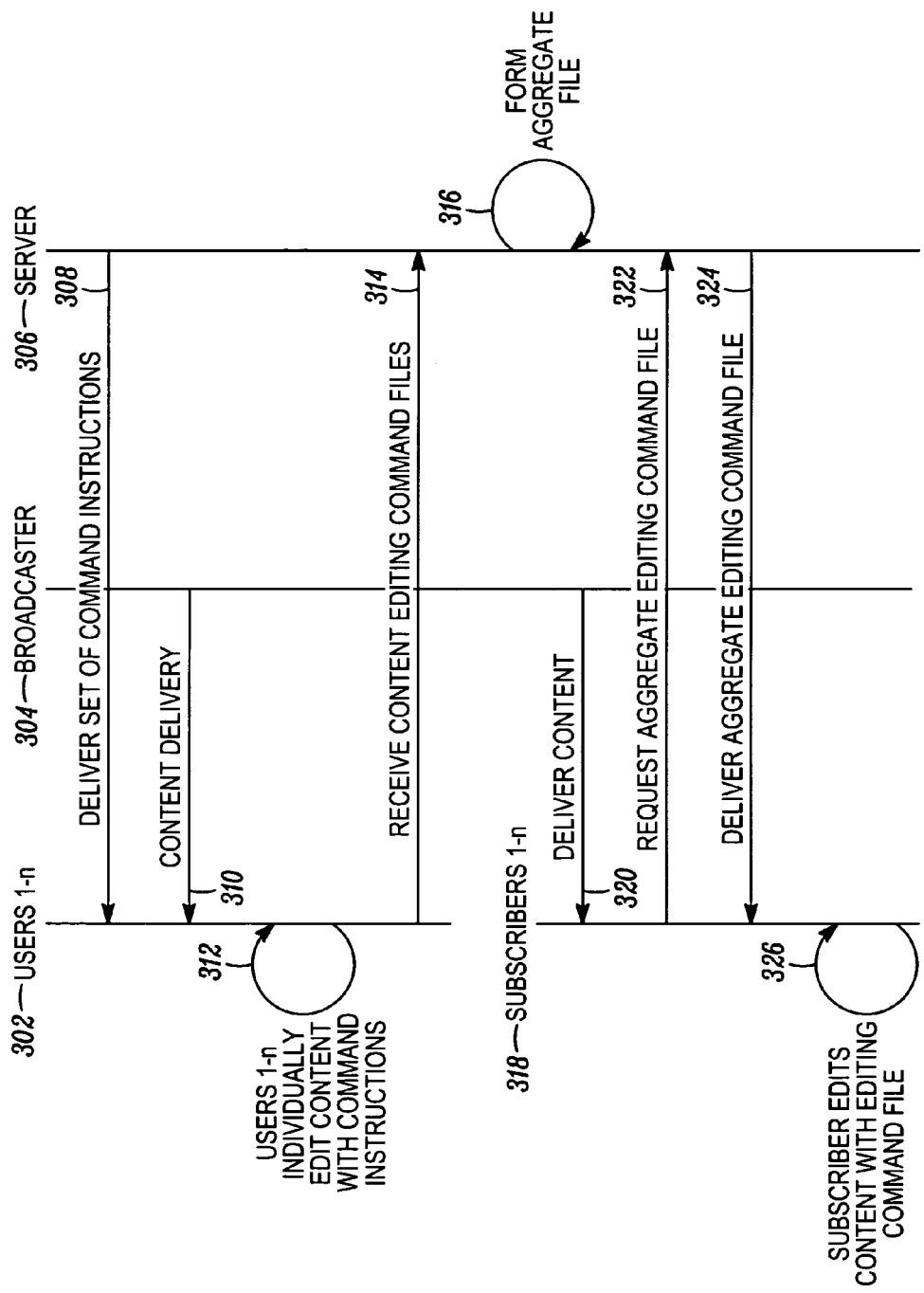
FIG. 3 illustrates a diagram for communications between a user, broadcaster and a content editing information file distribution server.

FIG. 3 is a signal diagram showing an embodiment of the sequence of requests and downloads. This description relating to FIG. 3 first addresses the users' operations and then the subscriber's operations. One or more users 302, the broadcaster 304 and the server 306 transmit and/or receive signals. The users may first receive from the server a set of command instructions 308 for carrying out the editing to generate content editing command files. The users receive the content 310 from the broadcaster in one or more of many different manners such as those described above. The users individually edit content with the set of command instructions 312 and send content editing command files to the server 314.

The server or another entity forms one or more aggregated files 316 from some or all of the content editing command files. The subscribers 318 have received delivery of content 320 from some source, for example, a broadcaster, either before or after they receive the editing command file. They may send a request to the server or other entity for an editing command file 322. The server may then deliver the editing command file to the subscriber 324. Alternatively, the subscriber may obtain the editing command file by some other means, for example, the subscriber may be the creator of the file. The subscriber can then process the content independently with the editing command file to generate an edited version of the content 326.

Figure 4:
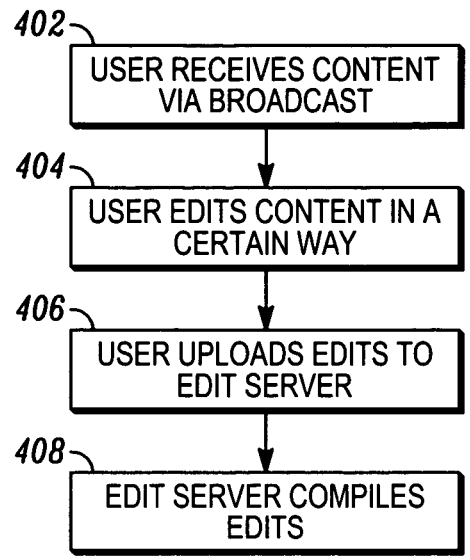
FIG. 4 is a flowchart for editing and uploading editing information.

FIG. 4 is a flowchart of a process for an individual user to edit the content and upload a content editing command to a server that aggregates files. At 402, a user receives content from some content source. At 404, the user edits the content according to particular preferences or according to certain criteria that may be predetermined. At 406, upon capture of a plurality of content editing command files from one or more users, the server compiles the edits into one or more aggregated content editing command files.

Figure 5:
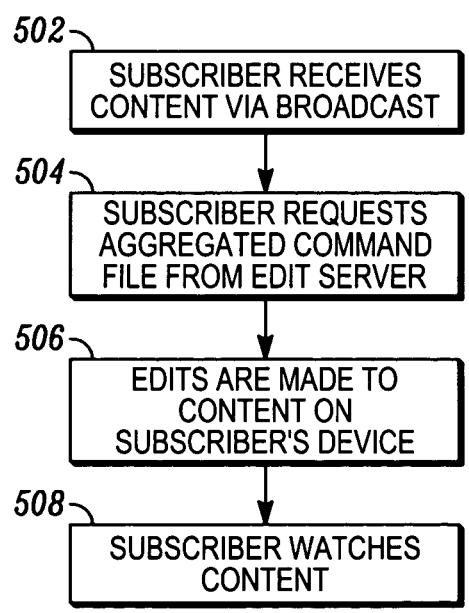
FIG. 5 is a flowchart for an individual subscriber to receive content and an aggregated content editing command file for editing content.

FIG. 5 is a process for an individual subscriber to receive an editing command file so that the subscriber may edit edited content using the file. At 502, the subscriber receives the content via broadcast or from some other source. At 504, the subscriber requests and downloads an editing command file from the server. At 506, edits are made to the content on the subscriber's device using the editing command file. At 508, the subscriber can view and/or listen to the edited content.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the invention, which is to be limited not by the exemplary embodiments described herein but by the appended claims.

What is claimed is:

1. A method in a content editing device for generating a content editing command file, the method comprising:
   editing content, in the content editing device, using editing commands;
   generating a content editing command file in the content editing device while editing the content, the content editing command file generated using the same editing commands used to edit the content, the content editing command file capable of editing other copies of the content edited wherein the content editing command file is devoid of the content capable of being edited;
   compiling first and second content editing command files into a single aggregated content editing command file, each of the first and second content editing command files generated from editing commands used to edit corresponding first and second copies of the same content.

2. The method of claim 1, editing another copy of the content, in the content editing device, using the content editing command file devoid of the content edited.

3. The method of claim 1, each of the first and second editing command files comprises different editing commands.

4. The method of claim 1, editing the content includes editing digital content, generating the content editing command file includes generating a digital content editing command file devoid of the digit content edited.

5. The method of claim 1, editing the content includes editing digital video content, generating the content editing command file includes generating a digital video content editing command file devoid of the digit video content edited.

6. The method of claim 1, editing content includes deleting a portion of the content, generating the content editing command file including content deletion commands used to delete a portion of the content.

7. The method of claim 1, editing content includes compressing a portion of the content, generating the content editing command file including content compression commands used to compress a portion of the content.

8. A server in a communication network, the server comprising: a controller, the controller including a reception module for receiving a plurality of content editing files, each of the plurality of content editing files containing different content editing information for common content; and the controller including a compilation module configured for compiling the plurality of content editing files into an aggregated content editing file.

9. The server of claim 8, the content editing information of the plurality of content editing files includes editing commands for the common content, the compilation module configured for compiling the plurality of content editing files by averaging the editing commands in each of the plurality of content editing files.

10. The server of claim 8, the content editing information of the plurality of content editing files includes different types of editing commands for the common content, the compilation module configured for compiling the plurality of content editing files based on editing command type.

11. The server of claim 8, the controller further comprising an instruction module for downloading command instructions by which to generate a content editing file.

12. The server of claim 8, the controller further comprising a distribution module for distributing the aggregated content editing file.

13. The server of claim 12, the controller further comprising a separate content distribution module for distributing content files separately and apart from the aggregated content editing file.

14. The server of claim 12, the aggregated content editing file devoid of the common content.

15. A method in a content editing device for generating a content editing command file, the method comprising:
obtaining, at the content editing device, a first content editing command file for editing content;
obtaining, at the content editing device, a second content editing command file for editing the content, each of the first and second content editing command files including editing commands for editing the content, the first and second content editing command files including variability in the editing commands;
compiling, at the content editing device, the first and second content editing command files into a single aggregated content editing command file, wherein the single aggregated content editing command file is for editing the content.

16. The method of claim 15, each of the first and second content editing command files generated from editing commands used to edit corresponding first and second copies of the content.

\* \* \* \* \*